(12) United States Patent
Baucom, Jr.

(10) Patent No.: US 8,282,135 B1
(45) Date of Patent: Oct. 9, 2012

(54) HYDRAULIC HOSE COUPLER

(76) Inventor: Donald L. Baucom, Jr., Kinston, AL (US)

( * ) Notice: Subject to any disclaimer, the term of this patent is extended or adjusted under 35 U.S.C. 154(b) by 364 days.

(21) Appl. No.: 12/640,746

(22) Filed: Dec. 17, 2009

(51) Int. Cl.
*F16L 11/12* (2006.01)

(52) U.S. Cl. ................................. 285/45; 285/127.1

(58) Field of Classification Search ............ 285/45, 285/38, 125.1, 127.1, 390
See application file for complete search history.

(56) References Cited

U.S. PATENT DOCUMENTS

| | | | | |
|---|---|---|---|---|
| 327,737 | A * | 10/1885 | Strong, W ........................... 285/38 |
| 1,859,449 | A * | 5/1932 | MacKenzie ..................... 285/181 |
| 1,929,434 | A * | 10/1933 | Kocher ............................ 184/7.3 |
| 2,663,325 | A * | 12/1953 | Bede ............................ 285/122.1 |
| 3,299,496 | A | 1/1967 | Christensen |
| 3,301,272 | A | 1/1967 | Pettyjohn et al. |
| 3,799,447 | A * | 3/1974 | Beal ............................ 239/288.5 |
| 3,904,116 | A * | 9/1975 | Jones et al. ..................... 239/127 |
| 4,094,536 | A * | 6/1978 | Cole et al. ..................... 285/21.1 |
| 4,162,801 | A * | 7/1979 | Kresky et al. ..................... 285/45 |
| 4,434,857 | A * | 3/1984 | Basrai ............................. 172/328 |
| 4,634,151 | A * | 1/1987 | Holt .................................. 285/38 |
| 4,784,649 | A * | 11/1988 | Imonti et al. ..................... 604/240 |
| 4,925,105 | A * | 5/1990 | Lin ................................ 239/154 |
| 4,932,257 | A * | 6/1990 | Webb ........................ 73/40.5 R |
| 4,936,345 | A | 6/1990 | Nix |
| 5,042,845 | A * | 8/1991 | Laboe ............................... 285/38 |
| 5,058,928 | A | 10/1991 | Watson |
| 5,158,327 | A | 10/1992 | Rowe |
| 5,381,962 | A * | 1/1995 | Teague ........................... 239/526 |
| 5,383,605 | A * | 1/1995 | Teague ........................... 239/526 |
| 5,415,353 | A * | 5/1995 | Jackson ......................... 239/530 |
| 5,477,583 | A * | 12/1995 | Deloe .......................... 15/236.01 |
| 5,669,558 | A * | 9/1997 | Ichel .............................. 239/311 |
| 5,823,578 | A * | 10/1998 | Chiou ............................... 285/38 |
| 5,884,657 | A * | 3/1999 | Srock ............................ 137/312 |
| 6,120,064 | A * | 9/2000 | McNamara ..................... 285/38 |
| 6,210,057 | B1 * | 4/2001 | Yannaci et al. ..................... 401/6 |
| 6,378,791 | B1 * | 4/2002 | Perry et al. ..................... 239/532 |
| 6,453,506 | B1 * | 9/2002 | Sumner ........................... 15/322 |
| 6,516,496 | B2 * | 2/2003 | Ekron ............................... 16/422 |
| 6,629,651 | B1 * | 10/2003 | Male et al. .................. 239/587.1 |
| 6,641,057 | B2 * | 11/2003 | Thomas et al. ............... 239/104 |
| 6,948,451 | B2 * | 9/2005 | Bond et al. ..................... 119/665 |
| 7,111,798 | B2 * | 9/2006 | Thomas et al. ............... 239/548 |
| 7,624,933 | B2 * | 12/2009 | Boekelman ..................... 239/124 |
| 7,677,476 | B2 * | 3/2010 | Burdsall et al. ............... 239/532 |
| 7,744,371 | B1 * | 6/2010 | Griffin et al. ..................... 433/91 |
| 7,854,398 | B2 * | 12/2010 | Hahn et al. ..................... 239/444 |
| 7,927,033 | B2 * | 4/2011 | Gansebom et al. ........... 401/139 |
| 2005/0189761 | A1 * | 9/2005 | Halverson et al. .............. 285/38 |
| 2005/0224405 | A1 * | 10/2005 | Neri et al. ..................... 210/321.6 |
| 2007/0046020 | A1 * | 3/2007 | Brass et al. ..................... 285/98 |
| 2008/0272203 | A1 * | 11/2008 | Leber ............................. 239/101 |
| 2009/0218808 | A1 * | 9/2009 | Krohn ............................. 285/45 |

* cited by examiner

*Primary Examiner* — Aaron Dunwoody
(74) *Attorney, Agent, or Firm* — Neustel Law Offices

(57) ABSTRACT

A hydraulic hose coupler for enabling an operator to easily connect and disconnect a hydraulic hose from a spool valve. The hydraulic hose coupler generally includes a tube member having a first portion, a joint and a second portion, wherein the first portion and second portion extend away from the joint at an approximate 135 degree angle with respect to each other. The first portion of the tube member will generally include a threaded first end for removably connecting to a hydraulic connector. The second portion of the tube member will generally include a threaded second end for removably connecting to a hydraulic hose. An ergonomic handle will preferably extend around the second portion of the tube member. After connecting the coupler between the hydraulic connector and hose, the operator may grip the handle and easily connect and disconnect the hose from a spool valve.

1 Claim, 5 Drawing Sheets

HYDRAULIC HOSE COUPLER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a coupling system for hydraulic hoses and more specifically it relates to a hydraulic hose coupler for enabling an operator to easily connect and disconnect a hydraulic hose from a spool valve.

2. Description of the Related Art

Any discussion of the related art throughout the specification should in no way be considered as an admission that such related art is widely known or forms part of common general knowledge in the field.

Hydraulics have been in use for years in various applications, including with farming equipment and large manufacturing equipment. Hydraulic fluid is generally transferred via a hydraulic hose to the equipment needing the fluid for operation. In the past, hydraulic hoses have included a hydraulic connector which acts as the male end in a male-female coupling between the hydraulic hose and the valve into which it is being inserted for use.

Because of the nature of conventional hydraulic hoses, which are generally comprised of smooth rubber hoses having a screwed-on hydraulic connector at the end, they tend to get oily and slick after repeated use. Further, hydraulic hoses are sometimes of such narrow diameter that it is difficult to grip the hoses when inserting into the valve. The slick nature of the rubber in connection with the generally smaller diameter of these hoses causes significant stress for the operator as he/she attempts to either connect or disconnect the hydraulic hose from the valve.

Because of the inherent problems with the related art, there is a need for a new and improved hydraulic hose coupler for enabling an operator to easily connect and disconnect a hydraulic hose from a spool valve.

BRIEF SUMMARY OF THE INVENTION

A system for enabling an operator to easily connect and disconnect a hydraulic hose from a spool valve. The invention generally relates to a hydraulic hose coupler which includes a tube member having a first portion, a joint and a second portion, wherein the first portion and second portion extend away from the joint at an approximate 135 degree angle with respect to each other. The first portion of the tube member will generally include a threaded first end for removably connecting to a hydraulic connector. The second portion of the tube member will generally include a threaded second end for removably connecting to a hydraulic hose. An ergonomic handle will preferably extend around the second portion of the tube member. After connecting the coupler between the hydraulic connector and hose, the operator may grip the handle and easily connect and disconnect the hose from a spool valve.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
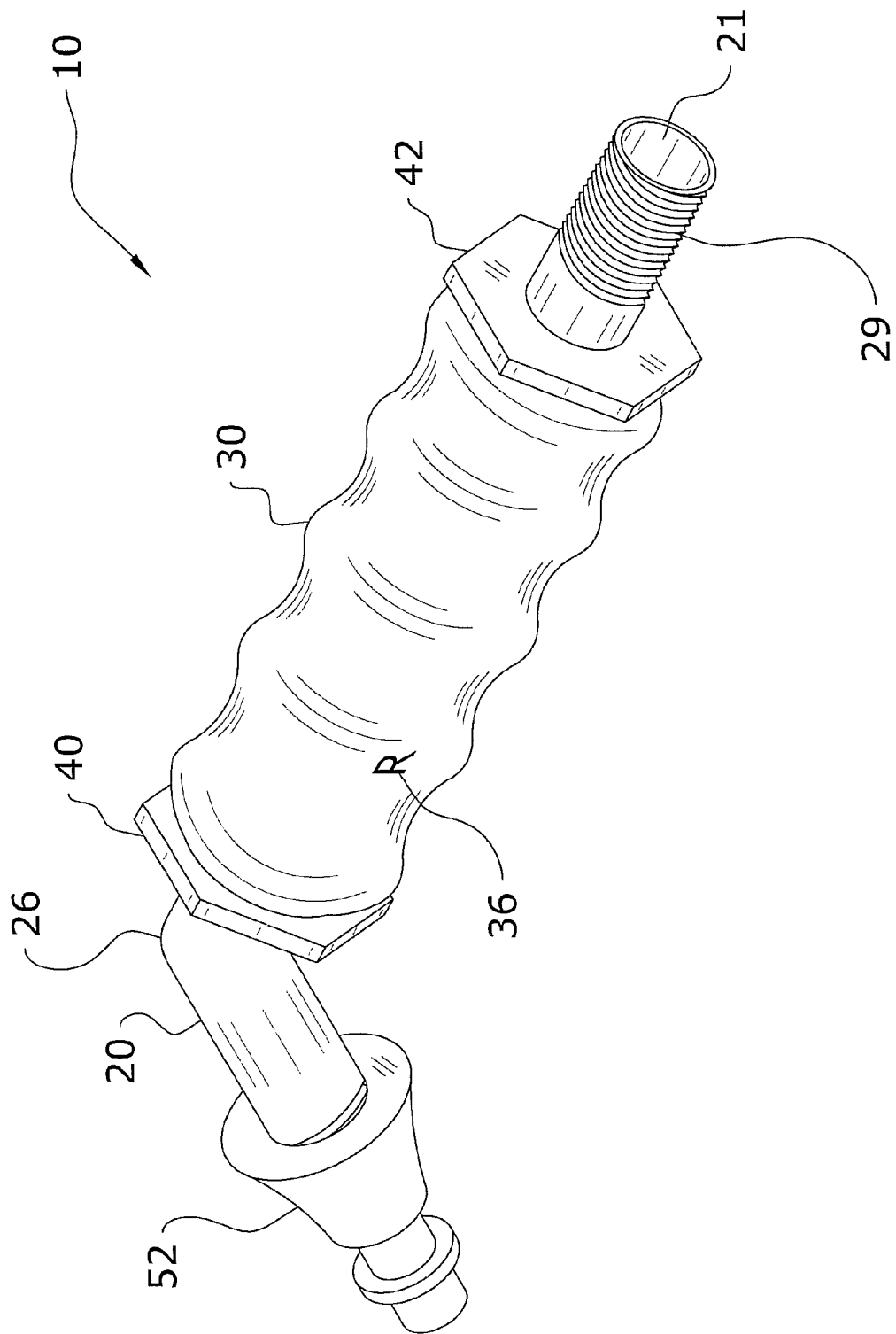
FIG. 1 is an upper perspective view of the present invention.

Turning now descriptively to the drawings, in which similar reference characters denote similar elements throughout the several views, FIGS. 1 through 5 illustrate a hydraulic hose coupler 10, which comprises a tube member 20 having a first portion 22, a joint 26 and a second portion 24, wherein the first portion 22 and second portion 24 extend away from the joint 26 at an approximate 135 degree angle with respect to each other. The first portion 22 of the tube member 20 will generally include a threaded first end 23 for removably connecting to a hydraulic connector 52. The second portion 24 of the tube member 20 will generally include a threaded second end 25 for removably connecting to a hydraulic hose 50. An ergonomic handle 30 will preferably extend around the second portion 24 of the tube member 20 for allowing an operator to firmly grip the present invention when inserting the hydraulic connector 52 into a valve 12.

B. Tube Member

The present invention will generally include a tube member 20 for coupling a hydraulic hose 50 to a valve 12 as shown in FIG. 1. The tube member 20 will generally be comprised of an elongated member having a first end 23 and a second end 25. The first end 23 of the tube member 20 will generally be adapted to be removably connected to a hydraulic connector 52 and the second end 23 of the tube member 20 will generally be adapted to be removably connected to a hydraulic hose 50, as shown in FIG. 2.

The tube member 20 may be comprised of various materials and configurations, but will generally be comprised of a durable metal material with a passageway 21 extending therethrough. In a preferred embodiment, the tube member 20 will be comprised of a non-rusting, metal pipe. It is preferable that the tube member 20 be of a material which does not rust, warp or bend when exposed to extreme heat, extreme cold or fluids. Although the tube member 20 is shown in the figures to be comprised of a cylindrically-shaped, elongated member, it is appreciated that various other shapes may be utilized so long as hydraulic fluid is capable of freely passing from the first end 23 to the second end 25 of the tube member 20 through its passageway 21.

Figure 2:
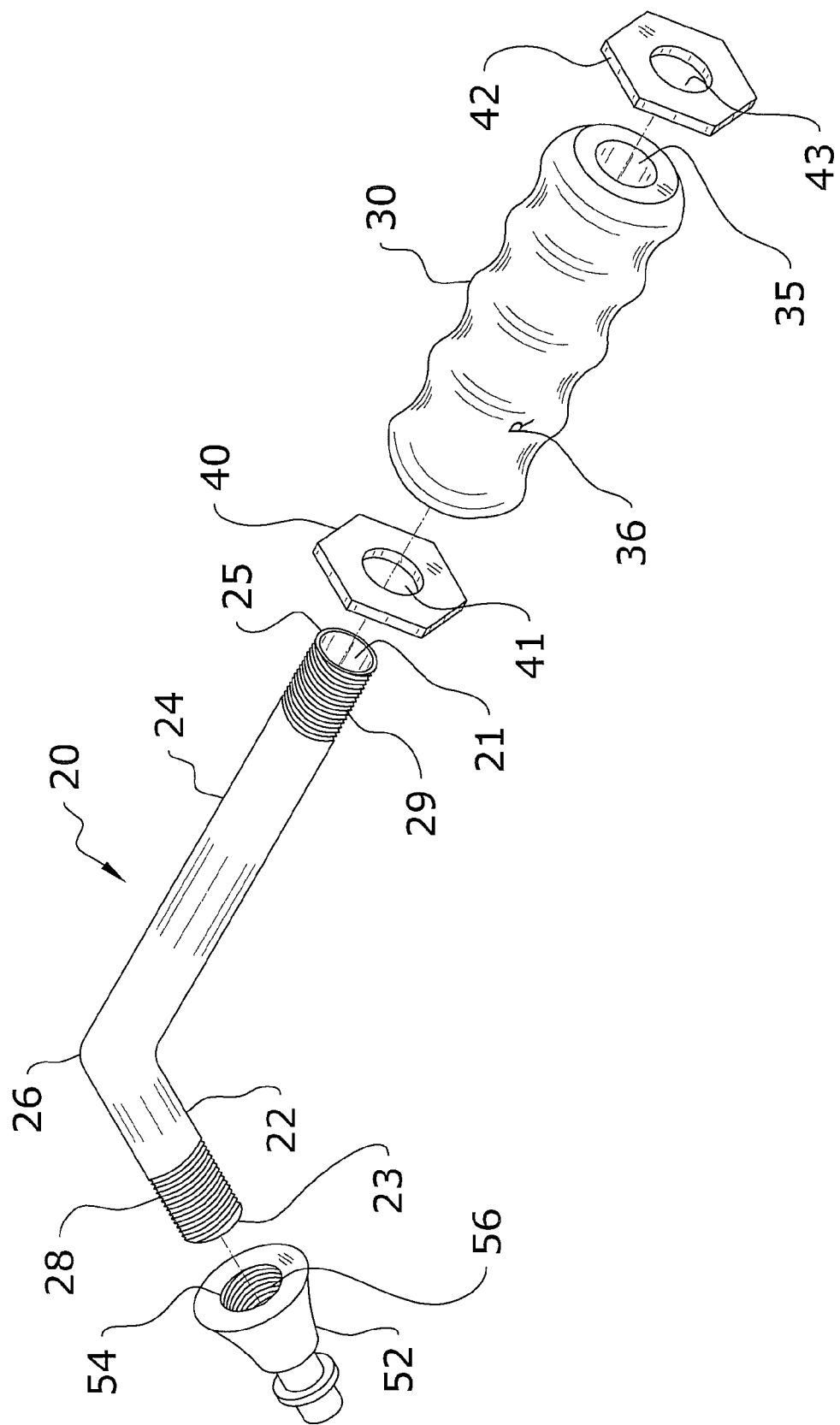
FIG. 2 is an exploded upper perspective view of the present invention.

The tube member 20 will preferably be comprised of a curved configuration as shown in FIG. 2, wherein the tube member 20 includes a first portion 22 adjacent its first end 23 and a second portion 24 adjacent its second end 25. The first portion 22 and second portion 24 will preferably extend away from a joint 26 at an angle to create the curved configuration shown in the figures. Preferably, the joint 26 will be comprised of the joint in the tube member 20 between the first portion 22 and the second portion 24, with the joint 26 being positioned approximately three-quarters of the length from the second end 25 to the first end 23 of the tube member's 20 length as shown in FIG. 2. However, it is appreciated that the joint 26 in the tube member 20 may be located at various other positioned on the tube member 20, including at its mid-point.

The joint 26 of the tube member 20 allows for improved maneuverability of the present invention as it is being connected to or disconnected from a valve 12. The degree of the joint 26 may vary, though in a preferred embodiment the first portion 22 and second portion 24 of the tube member 20 will extend away from the joint 26 at an obtuse angle, such as a 135 degree angle with respect to each other. However, it is appreciated that various other configurations may be utilized, with a larger or smaller angle being utilized for the joint 26 in the tube member 20 to accommodate different applications.

Figure 4:
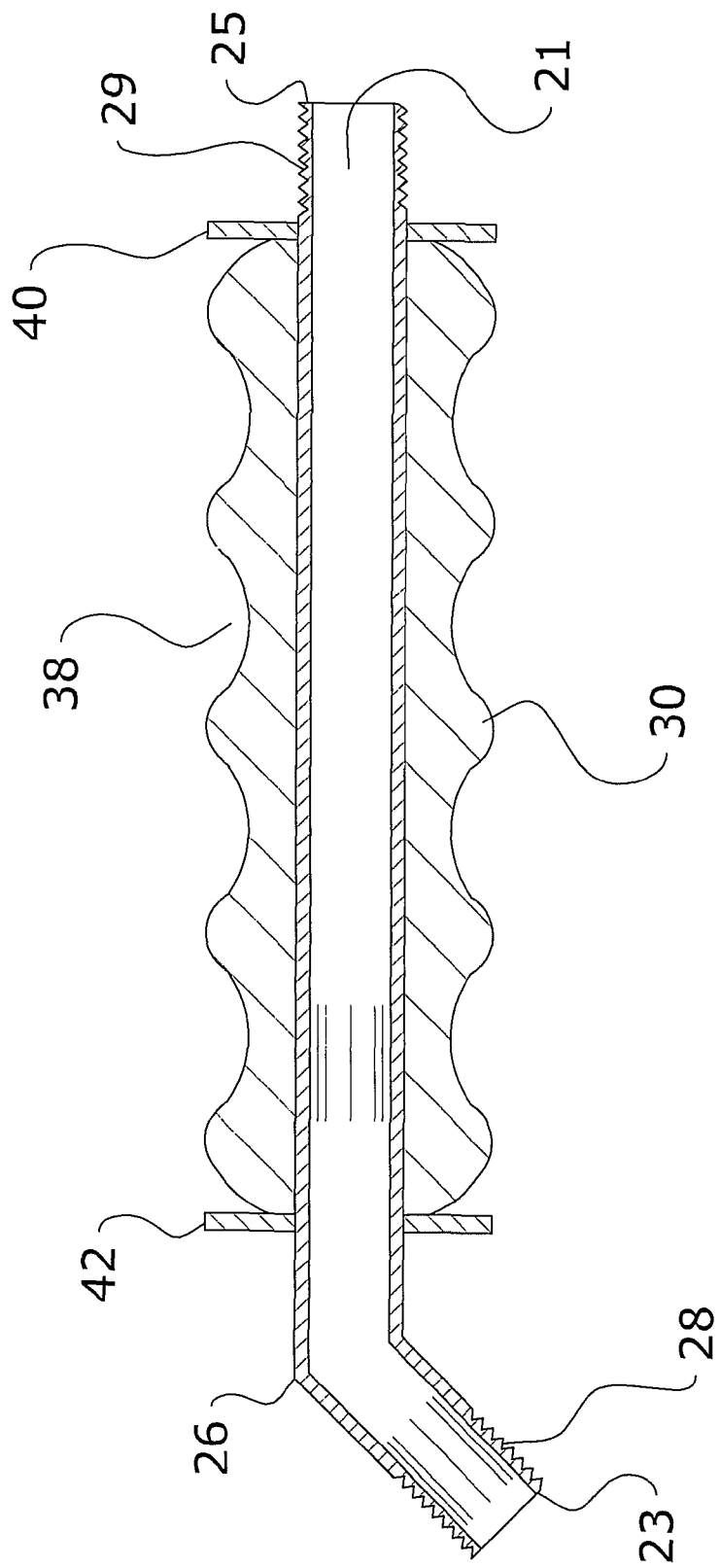
FIG. 4 is a side cutaway view of the present invention.
Figure 5:
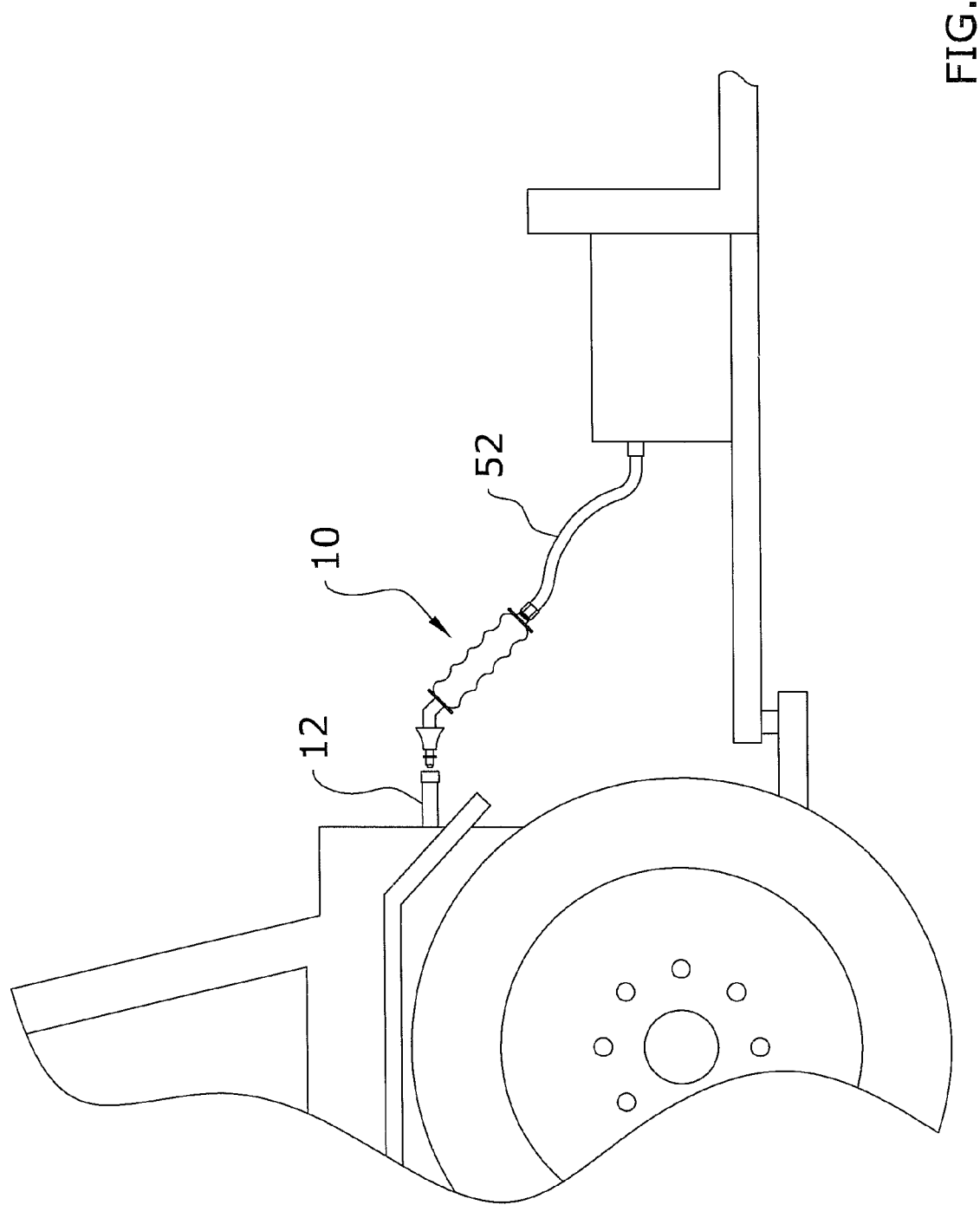
FIG. 5 is a side view of the present invention in use.

The tube member 20 will generally include a passageway 21 extending through its entire length from its first end 23 to its second end 25 as shown in FIG. 4. When the present invention is utilized to couple a hydraulic hose 50 to a valve 12, the hydraulic fluid will generally pass through the passageway 21 of the tube member 20 before entering the valve 12. The passageway 21 may be comprised of various diameters and cross-sections, though it is preferably comprised of a substantially circular cross-section having a large enough passageway for pressurized hydraulic fluid to pass therethrough at a rate optimal for hydraulic operations.

The tube member 20 will also generally include a first thread portion 28 at its first end 23 and a second thread portion 29 at its second end 25. The threads 28, 29 will generally be located at the proximal ends 23, 25 of the tube member 20 to effectuate coupling of the tube member 20 at its first end 23 to a hydraulic connector 52 and at its second end 25 to a hydraulic hose 50. In a preferred embodiment, the hydraulic connector 52 will threadably connect over the first end 23 of the tube member 20 and the hydraulic hose 50 will threadably connect over the second end 25 of the tube member 20 as illustrated in FIG. 2. Although threading 28, 29 is shown, it is appreciated that various other structures may be utilized to couple the tube member 20, so long as a secure connection is created between the hydraulic hose 50, tube member 20 and hydraulic connector 52 so as to allow hydraulic fluids to pass therethrough without any leaking or disruption to flow.

C. Handle

Figure 3:
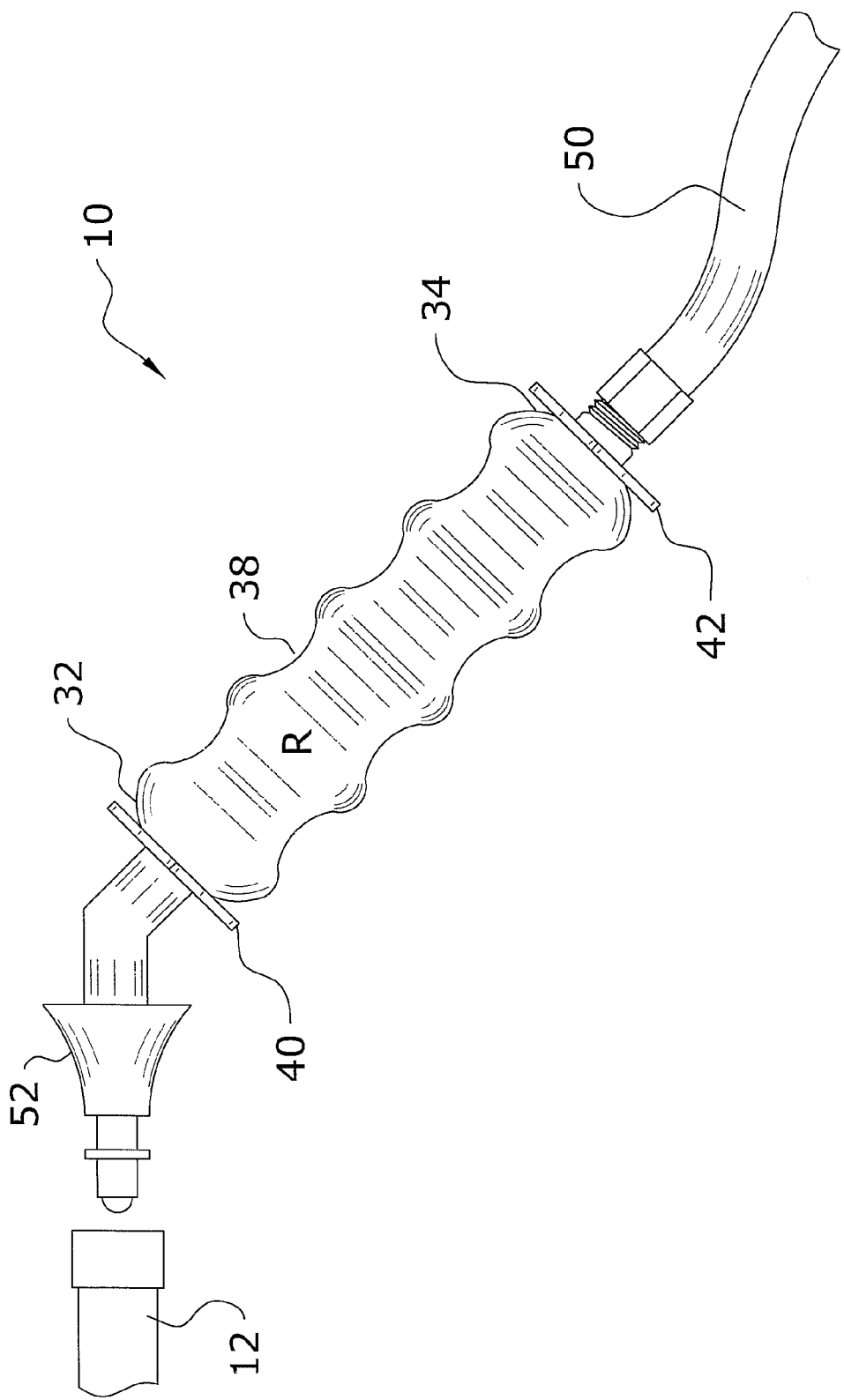
FIG. 3 is a side view of the present invention.

The present invention will generally include a handle 30 for allowing an operator of the present invention to firmly grip the tube member 20 when connecting to or disconnecting from a valve 12. The handle 30 will generally be comprised of a plastic or rubber grip which extends over the majority of the length of the tube member 20 between its joint 26 and its second end 25 as shown in FIG. 3. However, it is appreciated that the handle 30 may be comprised of various other materials, so long as the material utilized will not warp, bend or break when exposed to fluids, heat and/or cold and the material is capable of creating a firm gripping point for the operator of the present invention when in use.

The handle 30 will generally include a first end 32 and a second end 34, with an opening 35 extending through the handle 30 from its first end 32 to its second end 34 as shown in FIG. 4. The opening 35 of the handle 30 will preferably be comprised of a slightly larger diameter than the passageway 21 of the tube member 20 so that the handle 30 may slide over the tube member 20 to cover the majority of its outer surface. However, it is appreciated that in some embodiments the handle 30 will be integrally formed with the tube member 20. For example, the tube member 20 itself could include an ergonomic outer surface having indentations thereon without a separate handle 30 being needed. It is also appreciated that, in some embodiments, the handle 30 may be fixedly attached to the outer circumference of the tube member 20. For example, the handle 30 could be molded directly to the tube member 20 in some embodiments.

The handle 30 will preferably be comprised of an ergonomic configuration to ease gripping and include a plurality of indentations 38 along its outer surface as shown in FIG. 4. The indentations 38 of the handle 30 will generally create gripping points for the fingers of the operator of the present invention when in use. Although the figures illustrate an embodiment including four indentations (one for each finger of the operator), it is appreciated that more or less indentations 38 may be utilized on the handle 30 of the present invention so long as an operator is able to firmly grip the handle 30 when connecting or disconnecting the present invention from a valve 12.

The handle 30 may also include one or more markings 36 for indicating the proper placement of the hydraulic hose coupler 10 when in use. For example, where a pair of hydraulic hoses 50 are commonly used to connect to a pair of specific valves 12, the handle 30 of the first hydraulic hose coupler 10 could be marked with an "R" to indicate the right valve 12 and the handle 30 of the second hydraulic hose coupler 10 could be marked with an "L" to indicate the left valve 12. In other embodiments, the handle 30 of the first hydraulic hose coupler 10 could be marked with a "T" to indicate the top valve 12 and the handle 30 of the second hydraulic hose coupler 10 could be marked with a "B" to indicate the bottom valve 12. It is also appreciated that the handle 30 of the present invention may be comprised of different colors to assist with further differentiation when multiple units are being used for various applications.

D. Spacer Members

The present invention will generally include a pair of spacer members 40, 42 positioned adjacent the proximate ends 23, 25 of the tube member 20 as shown in FIG. 4. A first spacer member 40 will preferably be positioned adjacent the first end 23 of the tube member 20 and a second spacer member 42 will preferably be positioned adjacent the second end 25 of the tube member 20.

Each spacer member 40, 42 will generally be comprised of a washer configuration, with the first spacer member 40 including a first spacer opening 41 and the second spacer member 42 including a second spacer opening 43. In a preferred embodiment, each spacer member 40, 42 will be comprised of a hexagonal shape as shown in the figures for allowing easier gripping of the spacer members 40, 42 with a wrench. However, it is appreciated other shapes may be utilized for the spacer members 40, 42 without affecting the overall operation of the present invention.

The spacer openings 41, 43 will preferably be of a sufficient diameter such that no portion of the spacer members 40, 42 protrudes into the path of the hydraulic fluid as it enters the passageway 21 of the tube member 20. The spacer members 40, 42 may be fixedly attached to the ends 23, 25 of the tube member 20 or may be removably attached so as to allow easy disassembly of the hydraulic hose coupler 10 for maintenance as shown in FIG. 2.

E. Hydraulic Hose

The present invention will generally be removably attachable to the end of a hydraulic hose 50 as shown in FIG. 3. The hydraulic hose 50 will generally be comprised of a standard hose for transferring hydraulic fluids as is known in the art. The end of the hydraulic hose 50 will generally be threaded so as to allow a threaded connection between the end of the hose 50 and the second end 25 of the tube member 20.

The hydraulic hose 50 will also generally include a hydraulic connector 52 removably attached thereto. The hydraulic connector 52 will generally be comprised of the male portion of the male-female engagement between a hydraulic hose 50 and a valve 12. The hydraulic connector 52 will preferably include an inner surface 54 having threading 56 for allowing a threaded connection between the hydraulic connector 52 and the first end 23 of the tube member 20.

F. Operation of Preferred Embodiment

In use, the hydraulic hose coupler 10 is assembled by positioning the handle 30 over the second portion 24 of the tube member 20. The first spacer member 40 is generally secured into place over the tube member 20 adjacent the first end 32 of the handle 30 and the second spacer member 42 is generally secured into place over the tube member 20 adjacent the second end 34 of the handle 30 as shown in FIG. 2.

With the hydraulic hose coupler 10 assembled, the first thread portion 28 of the first end 23 of the tube member 20 will generally be threadably engaged with the inner threading 56 of the hydraulic connector 52 to removably connect the hydraulic connector 52 to the first end 23 of the tube member 20. The second thread portion 29 of the second end 25 of the tube member 20 will then generally be threadably engaged with the threading at the end of the hydraulic hose 50.

With the hydraulic hose coupler 10 attached at one end to the hydraulic connector 52 and at the other end to the hydraulic hose 50, the connector 52 may be engaged with the valve 12 by gripping the handle 30, inserting the connector 52 within the valve 12 and turning to effectuate a seal. The joint 26 of the tube member 20 allows for the hydraulic hose coupler 10 to be utilized in a wide variety of tight spaces by simply turning or adjusting the positioning the coupler 10 before insertion into the valve 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A hydraulic hose coupling system, comprising:
a hydraulic hose including a threaded end;
a hydraulic connector including a threaded inner surface;
a tube member, wherein said tube member includes a first portion, a second portion and a joint, wherein said first portion includes a first end and said second portion includes a second end, wherein said first portion extends away from said joint in a first direction and said second portion extends away from said joint in a second direction, wherein said first portion extends away from said joint at a 135 degree angle with respect to said second portion;
wherein said first end of said tube member includes a first threaded portion for removably engaging with said threaded inner surface of said hydraulic connector, wherein said second end of said tube member includes a second threaded portion for removably engaging with said threaded end of said hydraulic hose;
a hydraulic spool valve, wherein said hydraulic connector is removably connected to said hydraulic spool valve;
a passageway extending through said tube member from said first end to said second end;
a handle positioned over said second portion of said tube member, wherein said handle includes at least one directional marking, wherein said handle includes a plurality of indentations;
a first spacer member fixedly attached around said tube member adjacent a first end of said handle, wherein said first spacer member is comprised of a hexagonal washer; and
a second spacer member fixedly attached around said tube member adjacent a second end of said handle, wherein said second spacer member is comprised of a hexagonal washer.

* * * * *